(12) United States Patent
Tsai et al.

(10) Patent No.: US 8,226,517 B2
(45) Date of Patent: Jul. 24, 2012

(54) SPEED CHANGE MECHANISM

(75) Inventors: Ming-Chih Tsai, Taoyuan County (TW); Hsin-Yang Su, Taoyuan County (TW)

(73) Assignee: Sun Race Sturmey-Archer, Inc., Taoyuan County, Lu-Ju (TW)

( * ) Notice: Subject to any disclaimer, the term of this patent is extended or adjusted under 35 U.S.C. 154(b) by 126 days.

(21) Appl. No.: 12/842,890

(22) Filed: Jul. 23, 2010

(65) Prior Publication Data
US 2011/0034283 A1    Feb. 10, 2011

Related U.S. Application Data

(63) Continuation-in-part of application No. 12/788,287, filed on May 26, 2010.

(30) Foreign Application Priority Data

Aug. 10, 2009 (CN) .......................... 2009 1 0163673

(51) Int. Cl.
 F16H 48/06 (2006.01)
 F16H 3/44 (2006.01)
 F16H 37/06 (2006.01)
(52) U.S. Cl. .................. 475/149; 475/269; 475/329
(58) Field of Classification Search .................... 475/329
 See application file for complete search history.

(56) References Cited

U.S. PATENT DOCUMENTS

| | | | |
|---|---|---|---|
| 2,659,249 A | 11/1953 | Carr | |
| 3,481,220 A | 12/1969 | Kaptur | |
| 4,446,757 A | 5/1984 | LaFever | |
| 5,730,232 A | 3/1998 | Mixer | |
| 5,890,983 A * | 4/1999 | Kawahara et al. | 475/149 |
| 6,296,072 B1 * | 10/2001 | Turner | 180/220 |
| 7,967,718 B2 * | 6/2011 | Hino | 475/330 |
| 2006/0287151 A1 * | 12/2006 | Takeda et al. | 475/5 |
| 2007/0191177 A1 | 8/2007 | Nagai et al. | |

FOREIGN PATENT DOCUMENTS

| | | |
|---|---|---|
| EP | 2020375 A1 | 4/2009 |
| EP | 2204316 A1 | 7/2010 |
| WO | 2008088169 A1 | 7/2008 |

* cited by examiner

*Primary Examiner* — Edwin A Young
(74) *Attorney, Agent, or Firm* — Barlow, Josephs & Homes, Ltd.

(57) ABSTRACT

A speed change mechanism in which the gear ratio is selected by changing the direction of rotation of the power input includes first and second planetary gear sets enclosed within a hub shell. A DC electric motor is coupled to the sun gears of both gear sets and drives them simultaneously in the same rotary direction. In one of the gear sets the carrier arm is fixed and the ring gear is the output and in the other gear set the ring gear is fixed and the carrier arm is the output. A first one-way clutch transmits drive from an output of the first gear set to the hub shell and second one-way clutch transmits drive from an output of the second gear set to the hub shell, both clutches operating in the same direction. The outputs of the gear sets are driven in opposite rotary directions so that drive is transmitted to the hub shell either through the first gear set or the second gear set depending on the direction of rotation of the power input to provide two different gear ratios.

18 Claims, 6 Drawing Sheets

SPEED CHANGE MECHANISM

CROSS-REFERENCE TO RELATED APPLICATIONS

This application is a continuation-in-part of U.S. application Ser. No. 12/788,287, filed May 26, 2010. The entire disclosure of U.S. application Ser. No. 12/788,287 is incorporated herein by reference.

FIELD OF THE INVENTION

The present invention relates to a speed change mechanism or transmission, particularly but not exclusively for a motor.

BACKGROUND OF THE INVENTION

The transmission is a very important part in speed change electric vehicles, electric hand tools and other applications. The whole speed change system typically represents about half of the production cost; therefore research on the speed change mechanism is always an important item for any company in these fields. A good transmission can change the rotational speed ratio according to different requirements. For use in an eclectic vehicle such as an electric bicycle, the transmission can be used to change the speed ratio so as to achieve the objective of an appropriate rotational speed or torque for the rider in different conditions.

Planetary gear sets are commonly used in the transmission of an electric vehicle. A planetary internal transmission uses a planetary gear train as the principal part of a speed change mechanism which is typically installed in a gear housing of a rear wheel of the vehicle. A planetary internal transmission achieves different rotational speed ratios by changing the gear ratio of the planetary gear train through different input parts, output parts and fixed parts.

The use of a planetary gear train as the principal part of a speed change mechanism in an internal transmission has the following advantages. First, the volume is small and the structure is precise, and there is little limitation to the narrow installation and usage space of the rear wheel hub. Second, the gearshift process works stably. When used in a vehicle in which the rear wheel is driven by a chain, there is no requirement for the chain to be moved to engage with different chain wheels to change a gear ratio, thus the drawback of chain separation is effectively improved, and the transmission efficiency is increased. Third, the speed change mechanism is protected by the external housing of the wheel hub and is not affected by the external environment, thus the usage lifetime is increased. Fourth, the speed change mechanism is installed inside the wheel hub, and there is not as much noise as an external transmission produces during the gearshift process.

Planetary gear sets are well known and are sometimes referred to as epicyclic gearing. Often such gear sets are used to provide a speed reduction, in which case they may be referred to in the market as an "Epicyclic Gear Reducer" or "Planetary Gear Reducer". However, they can be arranged to provide a speed increase or overdrive. In a planetary gear set, there is a central gear typically called the "sun gear" which is surrounded by an annular, outermost gear called the "ring gear". The sun gear has teeth on its outer periphery and the ring gear has teeth on its inner periphery facing the sun gear. A plurality of "planet pinions" are spaced about the sun gear and mesh with both the sun gear and the ring gear. The planet pinions are typically arranged in groups of three of four connected together by means of a carrier arm which keeps the planet pinions in position relative to one another. Each planet pinion rotates about its own axis and where the carrier arm is not fixed, the pinions can rotate as group together with the carrier arm about the sun gear.

According to the known transmission principle of the planetary gear train working as a transmission, the sun gear, the planet pinion carrier arm, and ring gear spin around one another. In different gear ratios, one of the three is fixed and does not spin, another is driven to provide an input, and the other is an output. Different combinations result in different gear ratios needed when reducing, increasing and/or reversing the rotational speed/direction. Six possible combination conditions are shown in Table 1 below.

TABLE 1

Possible configurations of planetary gear set.

| Combination Condition | 1 | 2 | 3 | 4 | 5 | 6 |
|---|---|---|---|---|---|---|
| Sun Gear | Fixed | Output | Fixed | Input | Output | Input |
| Planet pinion | Input | Input | Output | Output | Fixed | Fixed |
| Ring Gear | Output | Fixed | Input | Fixed | Input | Output |

There are a number of rules that govern how the various components of a planetary gear set operate. Thus, the sun gear and the planet pinions always rotate in opposite directions. Where the ring gear and the planet pinions are free to rotate at the same time; they always rotate in the same direction. When the planet pinion carrier arm is the output, it always rotates in the same direction as the input.

Additionally, environmental issues have significantly promoted the use of electric bicycles and vehicles in recent years. Most electric bicycles and vehicles in use today are equipped with internal transmissions. Thus, internal transmissions have gradually become the research key point of large scale vehicle manufacturers.

The present invention has been developed using the planetary gear train as the core for a speed change mechanism for use especially, but not exclusively, with wheeled or electric vehicles. Whilst the invention has particular application for use with electrically propelled vehicles such as electric bicycles, it should be understood that the invention is not limited to this field but can find applications in other fields where there is a requirement for a speed change mechanism.

SUMMARY OF THE INVENTION

It is an objective to provide a speed change mechanism which overcomes, or at least mitigates, some or all of the limitations of the known speed change mechanisms.

One objective of the present invention is to provide a speed change mechanism composed of a plurality of planetary gear sets and which can be used in combination with a motor having an output that can be driven clockwise and counter-clockwise to achieve the objective of changing the reduction ratio to constitute a multi-stage gearshift and speed change.

In accordance with a first aspect of the invention, there is provided a speed change mechanism, comprising:

a. a first planetary gear set, comprising a first sun gear, a plurality of first planet pinions, a first carrier arm and a first ring gear;

b. a second planetary gear set, comprising a second sun gear, a plurality of second planet pinions, a second carrier arm and a second ring gear;

c. a power input connection for drivingly connecting the first and second sun gears with an output from a power source so as to drive the first and second sun gears in the same rotary direction;

d. a hub shell surrounding the first and second planetary gear sets;

e. a first one-way clutch for transmitting drive from an output of the first planetary gear set to the hub shell in a first rotary direction only; and f. a second one-way clutch for transmitting drive from an output of the second planetary gear set to the hub shell in the first rotary direction only;

wherein, in one of the first and secondary planetary gear sets the carrier arm is fixed and the ring gear is the output and in the other of the first and second planetary gear sets the ring gear is fixed and the carrier arm is the output.

In one embodiment, the first ring gear and second carrier arm are fixed, the first carrier arm comprising the output of the first planetary gear set and the second ring gear comprising the output of the second planetary gear set.

In an alternative embodiment, the first carrier arm and the second ring gear are fixed, the first ring gear comprising the output of the first planetary gear set and the second carrier arm comprising the output of the second planetary gear set.

The first and second one way clutches may comprise ratchet devices.

The hub shell may have a plurality of ratchet gears formed about its inner surface and each of the outputs of the first and second planetary gear sets may comprise a ratchet pawl for engagement with the ratchet teeth.

The power input may be drivingly connected with a DC electric motor. The motor may be an exterior-rotor motor or an interior-rotor motor. The motor may be located within the hub shell.

The hub shell may be mounted for rotation about a central shaft. The first and second sun gears, the first and second carrier arms, and the first and second ring gears may also be arranged for rotation about the shaft. The fixed components of the first and second planetary gears sets may be connected to the shaft, or to a component rotationally fixed relative to the shaft, to prevent their rotation about the shaft. Where the motor has an internal rotor, at least one of the fixed components of the first and second planetary gears sets may be connected with a part of the motor which is rotationally fixed relative to the shaft, such as a casing of the motor. A first fixed component of one of the first and second planetary gear sets may be fixed by means of a connection with the shaft, or with a component rotationally fixed to the shaft, whilst a second fixed component of the other of the first and second planetary gear sets is fixed by means of a connection with said first mentioned fixed component.

The speed change mechanism may comprise a centrifugal clutch for transmitting drive from the power input to at least one of the first and second sun gears. Where the power input is a DC electric motor, the centrifugal clutch may be arranged between an output shaft of the motor and the at least one of the first and second sun gears. The centrifugal clutch may be configured so that the at least one of the first and second sun gears is drivingly disconnected from the output shaft when the motor is not operating. The centrifugal clutch may be arranged in the drive line between the power input and the first sun gear.

The hub shell may be part of a wheel of a vehicle, such as a bicycle.

In accordance with a second aspect of the invention, there is provided a method of operating a speed change mechanism in accordance with the first aspect, the method comprising driving the first and second sun gears in a first rotary direction so as to transfer drive to the hub shell through one of the first and second planetary gear sets and its respective one-way clutch to achieve a first speed change ratio and subsequently driving the first and second sun gears in the opposite rotary direction so as to transfer drive to the hub shell through the other of the first and second planetary gear sets and its respective one-way clutch to achieve a second speed change ratio.

Where the power input is a DC electric motor, the step of changing the direction in which the first and second sun gears are driven may be carried out by reversing the polarity of a current supplied to the electric motor.

BRIEF DESCRIPTION OF THE DRAWINGS

Several embodiments of the invention will now be described by way of example only, with reference to the following drawings, in which.

DETAILED DESCRIPTION OF THE PREFERRED EMBODIMENTS

Figure 1:
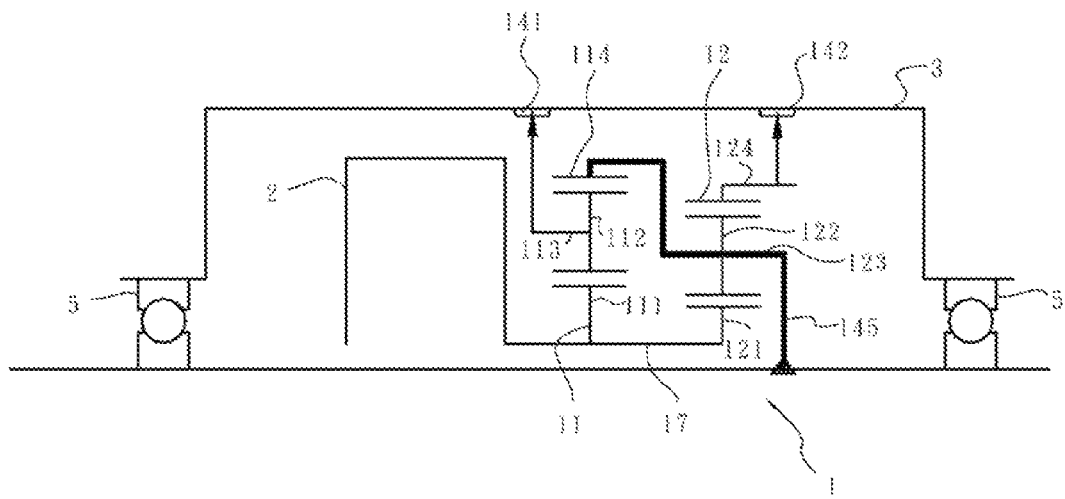
FIG. 1 is schematic sectional view of an upper half of a speed change mechanism in accordance with a first embodiment of the present invention.

Various aspects of a motor speed change mechanism in accordance with the present invention will become apparent in the following detailed description of preferred embodiments with reference to the accompanying drawings.

In the following description, the same reference numerals will be used to denote the same features or features that perform the same basic function in each of the embodiments described.

With reference initially to FIG. 1, a speed change mechanism 1 comprises: a power input source 2, a first planetary gear set 11, a second planetary gear set 12, and a hub shell 3.

The hub shell 3 is part of a wheel for an electric bicycle and is mounted for rotation about a central shaft or axle 4 by means of bearings 5. The power input source 2 is a DC electric, exterior rotor motor and is mounted inside the hub shell 3 co-axially about the central shaft 4 together with the first and second planetary gear sets 11, 12.

The first planetary gear set 11 is positioned proximal to the motor 2 and comprises: a first sun gear 111, a plurality of first planet pinions 112, a first planet pinion carrier arm 113 and a first ring gear 114. The second planetary gear set 12 is located on the opposite side of the first planetary gear set from the motor and comprises: a second sun gear 121, a plurality of second planet pinions 122, a second planet pinion carrier arm 123 and a second ring gear 124.

The DC motor 2 is an exterior rotor motor and has an output shaft 17 which is located co-axially about the central shaft 4 and which drivingly engages the first and the second sun gears 111, 121. The sun gears 111, 121 are therefore driven simultaneously from the motor 2 in the same rotary direction to provide an input to each of the first and second planetary gear sets 11, 12. In the first embodiment, the first ring gear 114 and the second carrier arm 123 are both fixed to prevent them from rotating about the central shaft 4, as indicated schematically by the bold line 145. To this end, the second carrier arm 123 is connected with the central shaft 4, or a component rotationally fixed relative to the central shaft 4, and the first ring gear 114 is mechanically connected to the second carrier arm 123. This provides a convenient means of fixing the first ring gear 114 and the second carrier arm 123 but other arrangements can also be adopted.

With first ring gear 114 fixed, the first carrier arm 113 comprises the output component of the first planetary gear set 11. The first carrier arm is drivingly coupled to the hub shell by means of a first one-way clutch mechanism 141 which is operative so that drive can only be transmitted to the hub shell 3 from the first carrier arm 113 when the first carrier arm 113 is driven in a first rotary direction (clockwise in the present embodiment). When the first carrier arm 113 is driven in a second, opposite rotary direction (counter-clockwise) no drive is transmitted through the first one-way clutch mechanism to the hub shell 3.

In the second planetary gear set 12 where the second carrier arm 123 is fixed, the second ring gear 124 comprises the output component and is drivingly coupled to the hub shell through a second one-way clutch mechanism 142. The second one-way clutch mechanism 142 is operative in the same direction as the first one-way clutch mechanism 141, so that drive can only be transmitted to the hub shell 3 from the second ring gear 124 when the second ring gear 124 is driven in the first rotary direction (clockwise in the present embodiment). When the second ring gear 124 is driven in the second rotary direction (counter-clockwise) no drive is transmitted through the second one-way clutch mechanism 142 to the hub shell 3.

The first and second one-way clutch mechanisms 141, 142 can be of any suitable type and may be ratchet devices. In one arrangement, each one-way clutch 141, 142 comprises an array of ratchet teeth (143, FIG. 3) formed about the inner circumference of the hub shell 3 and one or more ratchet pawls (144, FIG. 3) located on an outer diameter portion of the respective output component 113, 124 of the first and second planetary gear sets 11, 12, for engagement with the ratchet teeth. Each of the ratchet teeth has a steep face and a shallow or less steep face. Since both one-way clutches are operative in the same direction, the ratchet teeth 143 for the first and second one-way clutches can be formed as single array in a Monocoque type construction for ease of manufacture. However, two separate arrays of teeth could be provided. The ratchet pawls 144 are sprung loaded to protrude from the outer diameter of their respective output component 113, 124 so as to engage with a steep face of one of the ratchet teeth to transmit drive to the hub shell 3 when the respective output component 113, 124 is driven to rotate in the first (clockwise) direction only. When the output component 113, 124 is driven to rotate in the second (counter-clockwise) rotary direction its pawl rides over shallow faces of the ratchet teeth and is depressed against the spring bias so that no drive is transmitted.

In accordance with the rules of a planetary gear set as discussed above, in the first planetary gear set 11 where the first sun gear 111 is the input, the first ring gear 114 is fixed and the first carrier arm 113 is the output, the first carrier arm 113 is always driven in the same direction as the input sun gear 11. In contrast, in the second planetary gear set in which the second sun gear 121 is the input, the second carrier arm 123 is fixed and the second ring gear 124 is the output, the second ring gear 124 is always driven in the opposite direction to the input sun gear 121. Furthermore, because the first and second sun gears 111, 121 are both driven in the same direction by the motor output shaft 117, the outputs 113, 124 of the first and second planetary gears sets 11, 12 are always driven in opposite directions to one another so that drive is only transferred to the hub shell 3 through one of the planetary gear sets 11, 12 and its respective one-way clutch 141, 142 dependant on the direction on which the motor 2 is operated.

Figure 2:
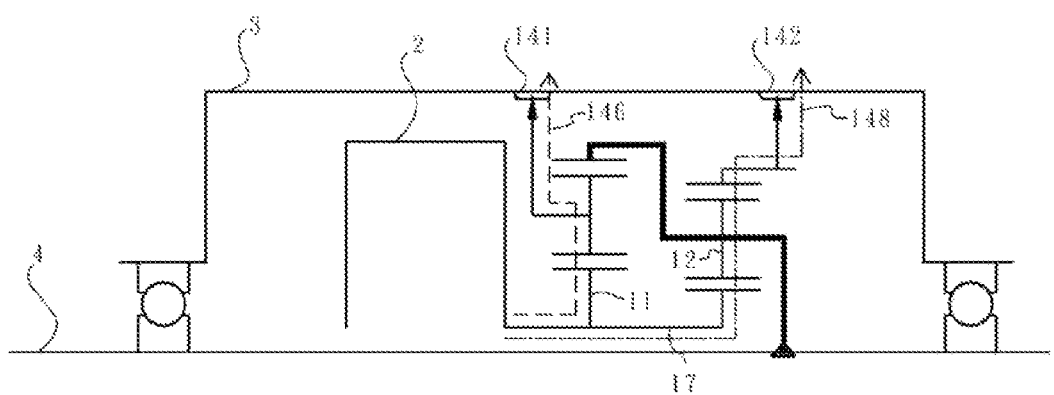
FIG. 2 is a schematic sectional view similar to that of FIG. 1 illustrating two different drive paths through the speed change mechanism depending on the direction of rotation of the power input to provide two speed change modes.

Because the electric motor 2 is a DC motor, it is possible by changing the positive and negative electrode direction of the input current to arrange for the motor 2 to drive the first and second sun gears 111, 121 to rotate in either the first (clockwise) direction or the second (counter-clockwise) direction. When the first and second sun gears 111, 121, are driven in the first (clockwise) direction, the first carrier arm 113 is also driven in the first (clockwise direction) whilst the second ring gear 124 is driven in the second (counter-clockwise) rotary direction. In this case, the hub shell 3 is driven by the first carrier arm 113 through the first one-way clutch mechanism 141, whilst no drive is transferred from the second ring gear 124 to the hub shell 3 through the second one-way clutch 142, which is in an idling state. This provides a first speed change mode of operation. The power transmission path through the speed change mechanism 1 in the first speed change mode is illustrated in FIG. 2 by the dashed line 146.

When the first and second sun gears 111, 121, are driven in the second (counter-clockwise) direction, the first carrier arm 113 is also driven in the second (counter-clockwise) direction whilst the second ring gear 124 is driven in the first (clockwise) rotary direction. In this case, the hub shell 3 is driven by the second ring gear 124 through the second one-way clutch mechanism 142, whilst no drive is transferred from the first carrier arm 113 to the hub shell 3 through the first one-way clutch 141, which is in an idling state. This provides a second speed change mode of operation. The power transmission path through the speed change mechanism 1 in the second speed change mode is illustrated in FIG. 2 by the chain dotted line 148.

The above is summarised in the following table in which "+"=rotation in a first (clockwise) direction and "−"=rotation in a second (counter-clockwise) direction:

TABLE 2

Direction of rotation of input and output components - first embodiment.

| | $1^{st}$ sun gear | $1^{st}$ carrier arm | $2^{nd}$ sun gear | $2^{nd}$ gear ring | Hub shell driven by |
|---|---|---|---|---|---|
| Motor drives+ | + | + | + | − | $1^{st}$ one-way clutch |
| Motor drives− | − | − | − | + | $2^{nd}$ one-way clutch |

In the speed change mechanism 1 of the first embodiment of the present invention, the rotational speed of the DC motor 2 is 800 rpm (revolutions per minute), and the gear teeth numbers of the first and second planetary gear sets 11, 12 are as shown below:

The number of teeth on the first and the second sun gears 111, 121 is 36;

the number of teeth on the first and second planet pinions 112, 122 are 54 and 44 respectively; and the number of teeth on the first and second ring gears 114, 124 are 144 and 124 respectively.

Calculated using the above data, the gear reduction ratio of the first planetary gear set 11 is 5:1 and the gear reduction ratio of the second planetary gear set is 3.444:1.

The output rotational speed rpm of the hub shell 3 in either of the first and second speed change modes can be calculated by dividing the rotational speed of the motor by the respective gear reduction ratio of the whichever of the first and the second planetary gear set is driving the hub shell.

Thus in the first speed change mode in which the hub shell is driven through the first planetary gear set 11 and the first one-way clutch 141, the rotational speed rpm of the hub shell 3 is calculated as follows:

800(rpm)[rotational speed of the power input terminal]÷ 5[gear reduction ratio through first planetary gear set]= 160[rotational speed of the hub]

Thereby, in the first speed change mode, the original 800 rpm output of the DC motor 2 reduces to 160 rpm through the motor speed change mechanism 1 to achieve an objective of low rotational speed and high torque.

In the second speed change mode in which the hub shell 3 is driven through the second planetary gear set 12 and the second one-way clutch 142, the rotational speed rpm of the hub shell 3 is calculated as follows:

800(rpm)[rotational speed of the power input terminal]÷ 3.444[gear reduction ratio through secondary planetary gear set]=232[rotational speed of the hub].

In the second speed change mode, the original 800 rpm output of the DC motor 2 reduces to 232 rpm through the motor speed change mechanism 1 to achieve an objective of low rotational speed and high torque.

It can be seen then that in the motor speed change mechanism 1 of the present invention, different speed change ratios are achieved by changing the direction of rotation of the power input 2. The appropriate speed change mode (gear) is chosen according to different requirements for any given application. For use in an electric vehicle, the ratios may be selected for starting, climbing and cruising, so that the power input 2 can have more efficient performance.

Effecting a gear change by changing the direction of rotation of the power input 2 through the first and second planetary gear sets 11, 12 is advantageous in that there is no friction generated as is the case with conventional gear box arrangements where it is necessary to actuate a clutch or switch the power path when changing gear. Accordingly, losses due to friction through transmission are reduced, and easy gear selection is provided for users.

In summary, the motor speed change mechanism 1 of the present invention uses a control system to change the positive and negative electrodes of the input current to the power input (DC motor) 2, so as to change the power input 2 to rotate either clockwise or counter-clockwise. Depending on the direction of rotation of the power input 2, the motor speed change mechanism 1 provides either a first or a second speed change mode to provide different gear ratios to vary the output speed and torque at the hub.

Figure 3:
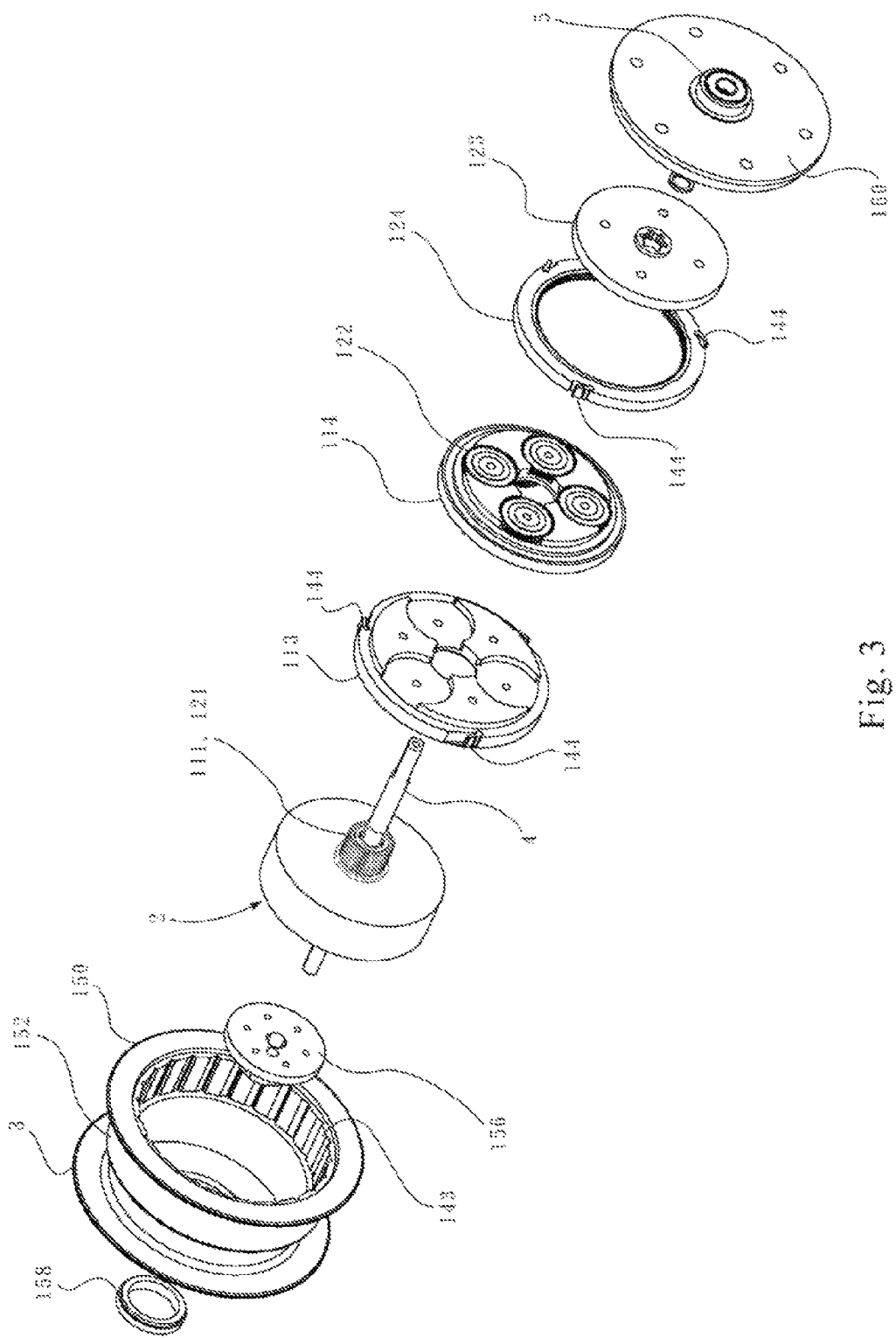
FIG. 3 is an exploded perspective view of the speed change mechanism of FIGS. 1 and 2 taken from one angle.
Figure 4:
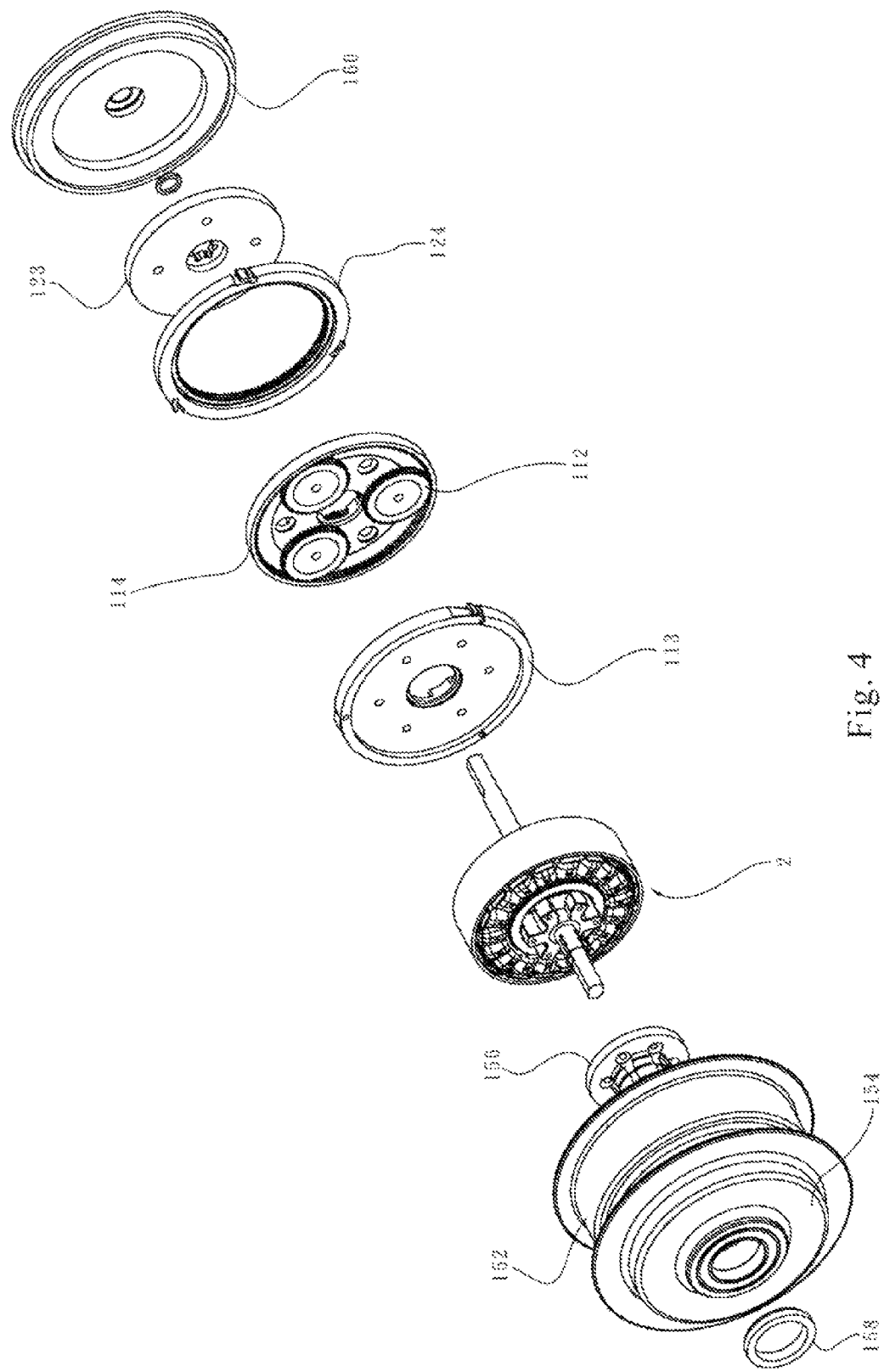
FIG. 4 is an exploded perspective view of the speed change mechanism of FIGS. 1 and 2 taken from a different angle.
Figure 5:
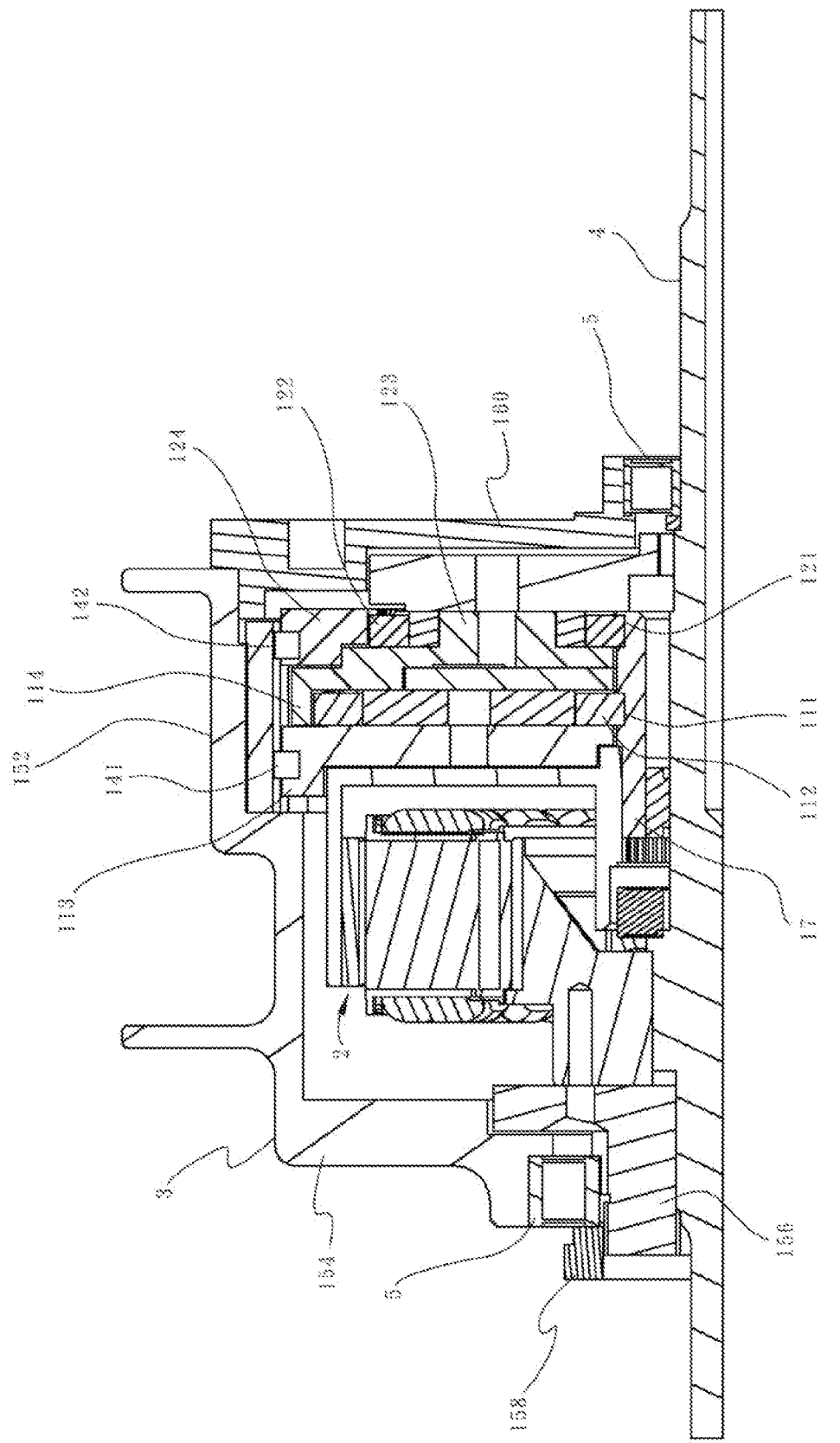
FIG. 5 is a longitudinal cross sectional view through an upper half of the speed change mechanism of FIGS. 3 and 4.

FIGS. 3 to 5 show construction of a speed change mechanism 1 in accordance with the first preferred embodiment in more detail.

In the mechanism as shown in FIGS. 3 to 5, the hub shell 3 comprises a main housing portion 150 having an annular region 152 which encircles the motor 2 and the planetary gear sets 11, 12 and a radial end plate portion 154 which encloses the left hand end (as shown) of the hub shell. A bearing 5 is mounted in the end plate 154 and its inner race is supported on a bearing support member 156 which is mounted on the axle 4. The left hand bearing 5 is locked into place by means of a locking ring 158 which engages with an annular portion of the bearing support as seen best in FIG. 5. The bearing support member 156 is attached to a stationary part of the motor 2. The other end of the hub shell (the right hand end as shown) is closed by means of a separable end plate assembly 160 which is assembled to the main housing portion 150. A further bearing 5 is located in the end plate assembly 160 but in this case is mounted directly to the axle 4.

The annular region 152 of the main housing portion 150 is stepped, with the ratchet teeth 143 for the first and second one way clutches 141, 142 being formed about the inner surface of a larger diameter portion of the annular region which extends about the planetary gear sets. As shown in FIGS. 3 and 4, three sprung ratchet pawls 144 are provided on outer circumferential regions of each of the first planet pinion carrier arm 133 and the second ring gear 124 for engagement with the ratchet teeth 143 as described previously.

In the arrangement as shown in FIGS. 3 to 5, the first and second sun gears 111, 121 are formed as a single component mounted or formed as an integral part of the output shaft 17 of the motor 2.

Figure 6:
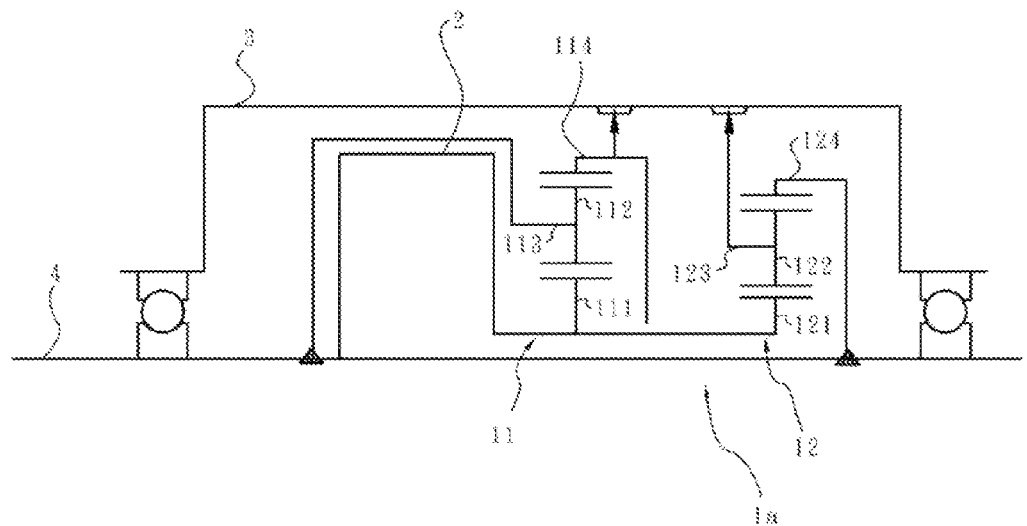
FIG. 6 is a schematic sectional view similar to that of FIG. 1 illustrating a second embodiment of a speed change mechanism in accordance with the invention.

FIG. 6 illustrates schematically a second embodiment of a speed change mechanism 1a in accordance with the present invention. The mechanism 1a of the second embodiment is essentially the same as that of the first embodiment and so only the differences will be described in detail. In all other respects, the second embodiment is constructed and operates in the same manner as the first embodiment and the reader should refer to the above description of the first embodiment for details.

In the second embodiment, the fixed components and the outputs of the first and second planetary gear sets 11, 12 are reversed. Accordingly, in this embodiment, in the first planetary gear set the first carrier arm 113 gear is fixed whilst the first ring gear 114 comprises the output and is drivingly coupled to the hub shell 3 through the first one-way clutch mechanism 141. In the second planetary gear set 12 the second ring gear 124 is fixed whilst the second carrier arm 123 comprises the output and is drivingly coupled to the hub shell 3 through the second one-way clutch mechanism 142.

The speed change mechanism of the second embodiment operates in the same manner as the first except that in this case drive is transmitted to the hub shell 3 through the second planetary gear set 12, the second carrier arm 123 and the second one-way clutch 142 when the motor 2 is driven in a first (clockwise) direction to provide a first speed change mode and is transmitted to the hub shell 3 through the first planetary gear set 11, the first ring gear 111 and the first one-way clutch 141 when the motor 2 is driven in a second (counter-clockwise) direction to provide a second speed change mode.

The above is summarised in the following table in which "+"=rotation in a first (clockwise) direction and "−"=rotation in a second (counter-clockwise) direction:

TABLE 3

Direction of rotation of input and output components - second embodiment.

|  | $1^{st}$ sun gear | $1^{st}$ gear ring | $2^{nd}$ sun gear | $2^{nd}$ carrier arm | Hub shell driven by |
|---|---|---|---|---|---|
| Motor drives+ | + | − | + | + | $2^{nd}$ one-way clutch |
| Motor drives− | − | + | − | − | $1^{st}$ one-way clutch |

Figure 7:
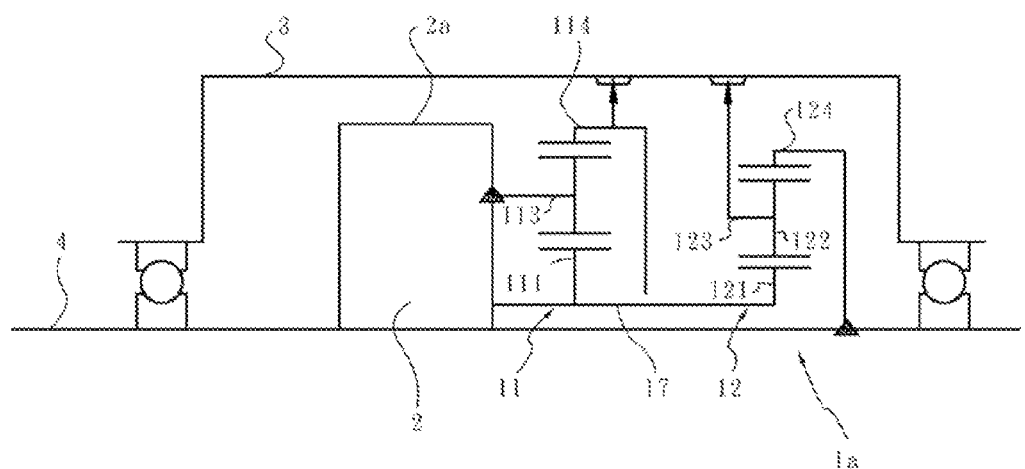
FIG. 7 is a schematic sectional view similar to that of FIG. 3 but illustrating a modification to the second embodiment; and, FIG. 8 is a schematic sectional view similar to that of FIG. 1 illustrating a third embodiment of a speed change mechanism in accordance with the invention.

FIG. 7 illustrates schematically a modification to the second embodiment in which the motor 2 is an internal rotor motor having an outer casing 2a rotationally fast with the central shaft 4. This enables the first carrier arm 113 to fixed by attachment to the casing 2a of the motor. This is more convenient than connecting the first carrier arm 113 to the central shaft 4 itself at a position behind the motor, as may be necessary where the motor has an external rotor as illustrated in FIG. 6. In all other respects, the embodiment shown in FIG. 7 is the same as that shown in FIG. 6 and described above.

Figure 8:
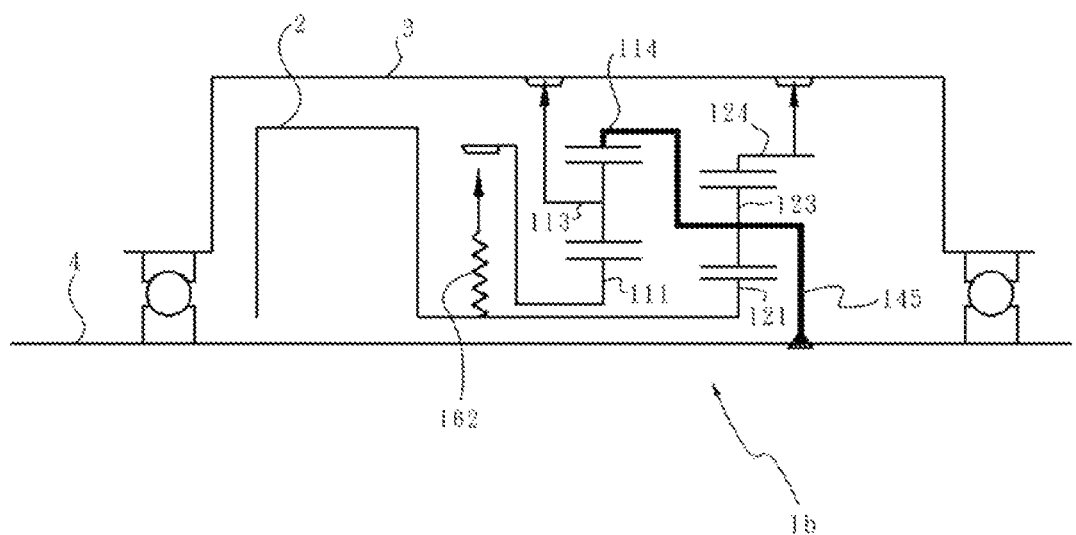

FIG. 8 illustrates a third embodiment of a speed change mechanism 1b in accordance with the invention. The speed change mechanism 1b as illustrated in FIG. 8 is essentially the same as the first embodiment 1 described above in relation to FIGS. 1 to 5 to which the reader should refer for detail. The third embodiment 1b differs from the first embodiment 1 in that the first and second sun gears 111, 121 are separate components and in that drive is transmitted from the output shaft 17 of the motor 2 to the first sun gear 111 through a centrifugal clutch 162. The centrifugal clutch 162 is arranged so that drive is only transmitted from the shaft 17 to the first sun gear 11 when the output shaft 17 is rotated by the motor above a minimum threshold speed. When the motor 2 is stopped and shaft 17 is not rotating, the centrifugal clutch is not engaged and the first sun gear 111 is disconnected from the shaft 17. This arrangement is advantageous as it allows the hub shell 3 to be rotated in a reverse direction without planetary gear sets 11, 12 locking up when the motor is not operating. Accordingly, where the speed change mechanism 1b is used to drive a wheel on an electric bicycle, the bicycle can be free wheeled in reverse when the motor 2 is not operating.

It will be appreciated that the centrifugal clutch 162 could be incorporated between the drive shaft 17 and the second sun gear 121 or that centrifugal clutches could be incorporated between the shaft 17 and each of the sun gears 111, 121. It will also be appreciated that similar arrangements could also be incorporated in the second embodiment as illustrated in FIGS. 6 and 7 and as described above.

Whilst reference has been made to the various components of the speed change mechanism and the power input as rotating either clockwise or counter-clockwise in the descriptions of the preferred embodiments, it will be appreciated that this convention has been adopted for clarity in the description and is not intend to limit the scope of the invent. In practice, the actual direction of rotation of the various components can be selected to suit the requirements of any particular application.

The embodiments described above should not be construed as a limitation on the actual applicable scope of the invention. The protected scope of the invention should cover various modifications and similar arrangements within the spirits of the invention and appended claims. As such, all modifications and alterations without departing from the spirits and scopes of the invention shall be regarded as further embodiments of the invention. In particular, whist the invention has been described in particular with reference to a speed change mechanisms for use in an electronic vehicle to drive a wheel hub, the invention can be applied in other applications, such as in the field of electronic tools, where there is need for a simple and robust speed change mechanism in which different the reduction ratios can be selected by reversing the direction of the input power drive.

Brief description of component representative symbols in the representative drawing of the present invention:
1 A first embodiment of a speed change mechanism
1a A second embodiment of a speed change mechanism
1b A third embodiment of a speed change mechanism
2 Power input (DC Motor)
2a Power input (DC Motor) casing
3 Hub shell
4 Central shaft
5 Bearings
11 The first planetary gear set
111 The first sun gear
112 The first planet pinion
113 The first carrier arm
114 The first ring gear
12 The second planetary gear set
121 The second sun gear
122 The second planet pinion
123 The second carrier arm
124 The second ring gear
17 Motor output shaft
141 The first one-way clutch
142 The second one-way clutch
143 Ratchet teeth for first and second one way clutches
144 Ratchet pawl for first and second one way clutches
145 Common fixing for first ring gear and second planet pinion carrier arm
146 Power transmission path in first speed change mode
148 Power transmission path in second speed change mode
150 Main housing portion of hub shell
152 Annular region of hub shell main housing portion
154 Radial end plate region of hub shell main housing portion
156 Bearing support member
158 Locking ring
160 Radial end plate assembly of hub shell
162 Centrifugal clutch

The invention claimed is:

1. A speed change mechanism, comprising:
a first planetary gear set, comprising a first sun gear, a plurality of first planet pinions, a first carrier arm and a first ring gear;
a second planetary gear set, comprising a second sun gear, a plurality of second planet pinions, a second carrier arm and a second ring gear;
a power input connection for drivingly connecting the first and second sun gears with an output from a power source;
a hub shell surrounding the first and second planetary gear sets;
a first one-way clutch for transmitting drive from an output of the first planetary gear set to the hub shell in a first rotary direction only; and
a second one-way clutch for transmitting drive from an output of the second planetary gear set to the hub shell in the first rotary direction only;
wherein, in one of the first and secondary planetary gear sets the carrier arm is fixed and the ring gear is the output and in the other of the first and second planetary gear sets the ring gear is fixed and the carrier arm is the output.

2. A speed change mechanism as claimed in claim 1, wherein the first ring gear and second carrier arm are fixed, the first carrier arm comprising the output of the first planetary gear set and the second ring gear comprising the output of the second planetary gear set.

3. A speed change mechanism as claimed in claim 1, wherein the first carrier arm and the second ring gear are fixed, the first ring gear comprising the output of the first planetary gear set and the second carrier arm comprising the output of the second planetary gear set.

4. A speed change mechanism as claimed in claim 1, wherein the first and second one way clutches are ratchet devices.

5. A speed change mechanism as claimed in claim 4, wherein the hub shell has a plurality of ratchet gears formed about an inner surface and each of the outputs of the first and second planetary gear sets comprises a ratchet pawl for engagement with the ratchet teeth.

6. A speed change mechanism as claimed in claim 1, wherein the power source comprises a DC electric motor.

7. A speed change mechanism as claimed in claim 6, wherein the motor is an exterior-rotor motor.

8. A speed change mechanism as claimed in claim 6, wherein the motor is an interior-rotor motor.

9. A speed change mechanism as claimed in claim 6, wherein the motor is located within the hub shell.

10. A speed change mechanism as claimed in claim 1, wherein the hub shell is mounted for rotation about a central shaft.

11. A speed change mechanism as claimed in claim 10, wherein each of the first and second planetary gear sets is mounted coaxially about the central shaft.

12. A speed change mechanism as claimed in claim 11, wherein the fixed components of the first and second planetary gears sets are connected to the central shaft, or to a component rotationally fixed relative to the shaft, to prevent their rotation about the shaft.

13. A speed change mechanism as claimed in claim 11, wherein the power source comprises a DC electric motor having an internal rotor and at least one of the fixed components of the first and second planetary gears sets is connected with a part of the motor which is rotationally fixed relative to the shaft.

14. A speed change mechanism as claimed in claim 11, wherein a first fixed component of one of the first and second planetary gear sets is fixed by means of a connection with the shaft, or with a component rotationally fixed to the shaft, whilst a second fixed component of the other of the first and second planetary gear sets is fixed by means of a connection with said first mentioned fixed component.

15. A speed change mechanism as claimed in claim 1, wherein the speed change mechanism comprises a centrifugal clutch for transmitting drive from the power input to at least one of the first and second sun gears.

16. A speed change mechanism as claimed in claim 1, wherein the hub shell is part of a wheel of a vehicle.

17. A method of operating a speed change mechanism in accordance with any one of the preceding claims, the method comprising driving the first and second sun gears in a first rotary direction so as to transfer drive to the hub shell through one of the first and second planetary gear sets and its respective one-way clutch to achieve a first speed change ratio and subsequently driving the first and second sun gears in the opposite rotary direction so as to transfer drive to the hub shell through the other of the first and second planetary gear sets and its respective one-way clutch to achieve a second speed change ratio.

18. A method of operating a speed change mechanism as claimed in claim 17, wherein the power source is a DC electric motor and the step of changing the direction in which the first and second sun gears are driven is carried out by reversing the polarity of a current supplied to the electric motor.

* * * * *